(12) United States Patent
Ueda

(10) Patent No.: US 9,071,760 B2
(45) Date of Patent: Jun. 30, 2015

(54) IMAGE PICKUP APPARATUS

(71) Applicant: CANON KABUSHIKI KAISHA, Tokyo (JP)

(72) Inventor: Haruhisa Ueda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/080,117

(22) Filed: Nov. 14, 2013

(65) Prior Publication Data

US 2014/0146213 A1 May 29, 2014

(30) Foreign Application Priority Data

Nov. 23, 2012 (JP) ................................. 2012-256955
Nov. 7, 2013 (JP) ................................. 2013-230927

(51) Int. Cl.
*H04N 5/232* (2006.01)

(52) U.S. Cl.
CPC ....... *H04N 5/23293* (2013.01); *H04N 5/23212* (2013.01); *H04N 5/23216* (2013.01); *H04N 5/23245* (2013.01)

(58) Field of Classification Search
CPC ............................ H04N 5/23216; G06F 3/044
USPC ................... 348/333.02, 345, 223.1; 345/173
See application file for complete search history.

(56) References Cited

U.S. PATENT DOCUMENTS

| 7,728,903 B2 * | 6/2010 | Ohnishi ..................... 348/345 |
| 2009/0219255 A1 * | 9/2009 | Woolley et al. ................ 345/173 |
| 2010/0020222 A1 * | 1/2010 | Jones et al. ............... 348/333.02 |
| 2011/0193809 A1 * | 8/2011 | Walley et al. .................. 345/173 |

FOREIGN PATENT DOCUMENTS

JP 2004-205885 A 7/2004

* cited by examiner

*Primary Examiner* — Joel Fosselman
(74) *Attorney, Agent, or Firm* — Cowan, Liebowitz & Latman, P.C.

(57) ABSTRACT

Provided is an image pickup apparatus including: an image pickup unit configured to pick up an object image imaged by a lens unit; and a display unit configured to display an image output from the image pickup unit, the display unit detecting a first close condition and a second close condition of a photographer. The display unit displays a first display object indicating a focal point adjustment area on a display image of the object image in response to detection of the first close condition, and displays a second display object indicating a focusing command area on the display image of the object image corresponding to a range of detection of the second close condition.

16 Claims, 5 Drawing Sheets

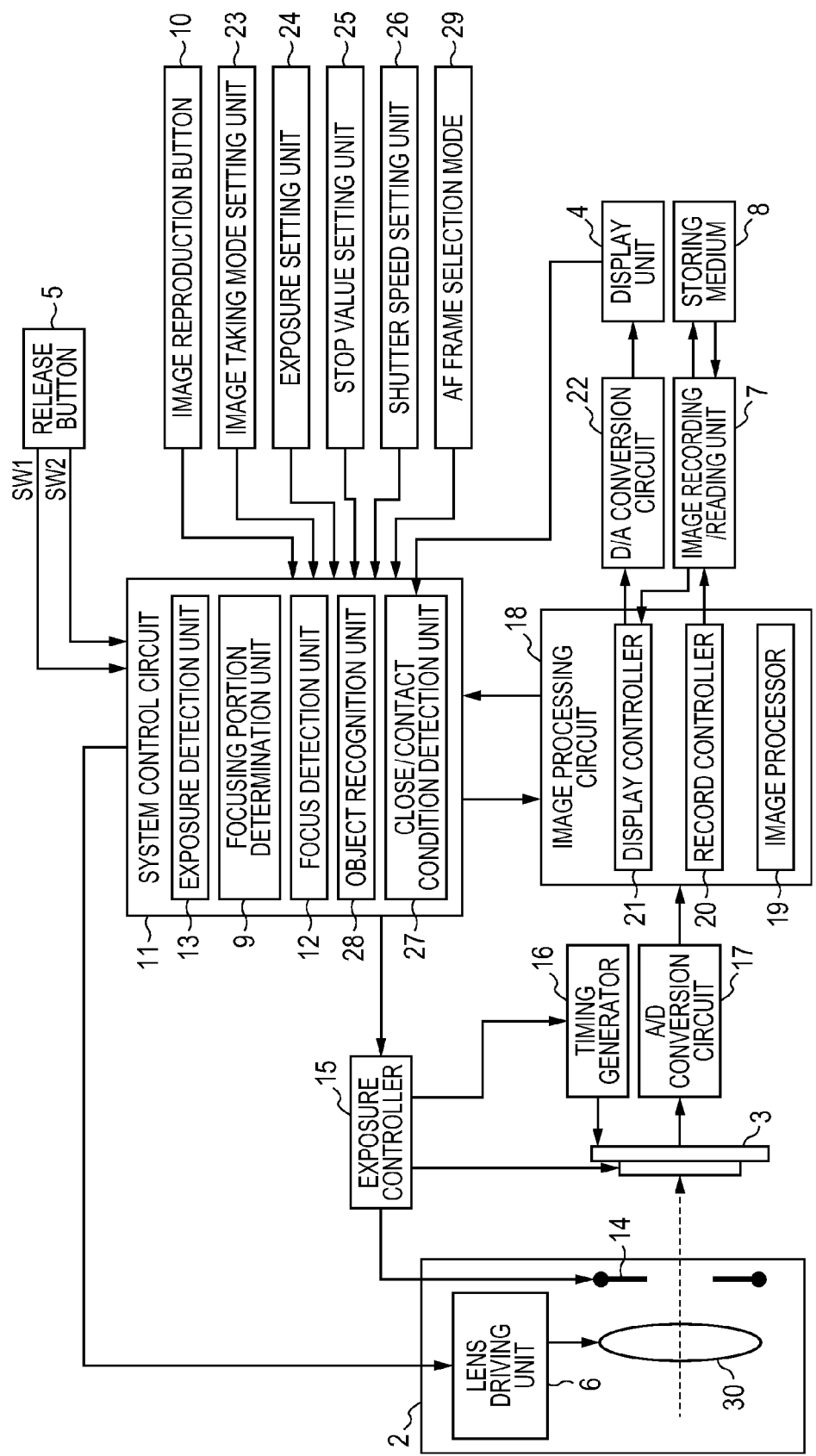

IMAGE PICKUP APPARATUS

BACKGROUND OF THE INVENTION

1. Field of the Invention

The present invention relates to a camera. In particular, the present invention relates to a camera that has a display unit capable of detecting a close condition of a finger of a photographer or a pen (close condition detection) and displaying an auto focus (AF) frame.

2. Description of the Related Art

In recent years, electronic devices having an image pickup capability, such as a digital camera and a cellular phone equipped with a camera function, have become more popular. Those electronic devices have a display device, such as a liquid crystal display or an organic EL display, and can display a picked-up image captured via a lens by an image pickup unit on the display device as it is. A user can check the composition, the exposure, and the focus position of the lens while viewing the displayed image, and take the image of an object. In addition, such an electronic device is provided with a touch panel function that is achieved by a pressure type touch sensor or capacitance touch sensor mounted on the display device, and detects a contact of a finger of a photographer, a pen, or the like (contact condition detection) to manipulate the display device. A digital still camera disclosed in Japanese Patent Application Laid-Open No. 2004-205885 is configured so that, when a photographer specifies an object on an image that is captured by an image pickup unit and displayed on the display of the digital still camera, on the display, the object specified by the photographer can easily be focused. A pressure-sensitive transparent touch panel is mounted on the display. When the photographer touches an object displayed on the display, an AF frame (focal point adjustment area) is displayed at a position where the touch panel detects a contact condition, and contrast information in the range of the AF frame is detected. Then, the lens is driven based on the detected contrast information in such a way that the object at the position touched by the photographer is focused.

However, the AF frame is displayed on the display when the photographer contacts the touch panel, and focus information in the range of the AF frame is detected according to the related art, and hence the AF frame may easily hide behind fingers or the like. Further, it may not be known previously how autofocusing is carried out depending on an AF mode, such as a multipoint AF mode to set an entire specified object in the AF range, a face recognition mode to autofocus on the face of an object, or a point tracking mode to autofocus and track a single local point specified. When an object is a low-contrast portion or a dark portion, a portion to be focused may be shifted from the portion intended by a photographer and the photographer may not be aware of such shifting beforehand. When every AF frame selectable as a focal point adjustment area is normally displayed on the display, by way of contrast, an object or the background can entirely hide behind the AF frame and become difficult to see.

SUMMARY OF THE INVENTION

The present invention provides a camera capable of displaying an autofocusable AF frame at a position intended by a photographer without making an object or the background displayed on a display difficult to see and without hiding the AF frame behind fingers or the like beforehand.

An image pickup apparatus according to one embodiment of the present invention includes: an image pickup unit configured to pick up an object image formed by a lens unit; and a display unit configured to display an image output from the image pickup unit, the display unit detecting a first close condition and a second close condition of a photographer. The display unit displays a first display object indicating a focal point adjustment area on a display image of the object image in response to detection of the first close condition, and displays a second display object indicating a focusing command area on the display image of the object image corresponding to a range of detection of the second close condition.

Further features of the present invention will become apparent from the following description of exemplary embodiments with reference to the attached drawings.

BRIEF DESCRIPTION OF THE DRAWINGS

FIG. 1 is a block diagram illustrating the configuration of an example of a camera applicable to the present invention.

DESCRIPTION OF THE EMBODIMENTS

According to a camera embodying the present invention, when a photographer brings a finger or the like close to an object image shown on a display image displayed on a display unit, the display unit displays a first frame indicating a focusing available area on the display image of the object image corresponding to a range of the close condition detection. When the photographer contacts the object image shown on the display image with a finger or the like, the display unit displays a second frame indicating a focusing command portion on the display image of the object image corresponding to a range of the contact condition detection. In other words, a close condition is detected by a touch sensor to determine whether or not autofocusing in the range of close condition detection is possible in accordance with an AF mode, and a first frame indicating a focusing available area is displayed as an AF candidate frame. Then, in response to detection of a contact condition, a second frame indicating a final focusing command portion is displayed in the range of contact condition detection that is selected from the first frame in accordance with the AF mode.

An exemplary embodiment of the present invention is now described in detail referring to the accompanying drawings.

First Embodiment

Figure 2A:
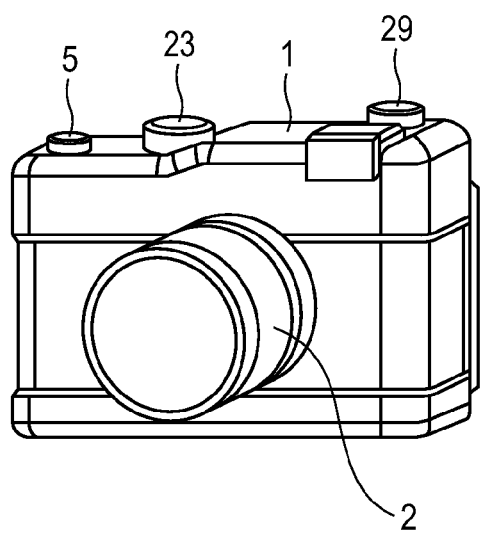
FIG. 2A is a front perspective view illustrating the example of the camera applicable to the present invention.
Figure 2B:
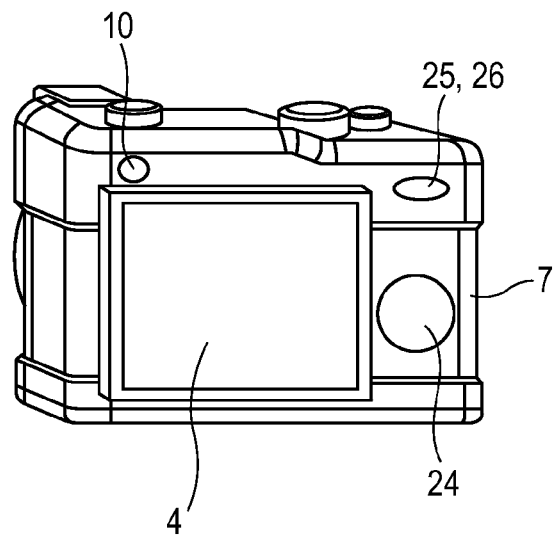
FIG. 2B is a rear perspective view illustrating the example of the camera applicable to the present invention.

Hereinafter, the main configuration of a first embodiment of the present invention is described referring to FIG. 1, and FIGS. 2A and 2B. FIG. 1 is a block diagram illustrating the internal configuration of a camera 1. FIGS. 2A and 2B are external perspective views of the camera 1.

A lens unit 2 is provided on the front side of the camera 1 so that light entering through the image taking lens unit 2 forms an image on an image pickup unit 3 provided inside the camera 1. The image pickup unit 3 can detect focusing and exposure. The image pickup unit 3 can pick up an image through an electronic shutter which controls the storage of electric charges, and can output a through-image (image displayed on a display unit 4 based on the output of the image pickup unit 3) of an object image. The output through-image is displayed on the display unit 4 so that a photographer can check the focus, composition, and exposure. The display unit 4 displays an image output from the image pickup unit 3, and can superimpose a frame indicating a focal point adjustment area on the output image from the image pickup unit 3. The display unit 4 further can detect a close condition and a contact condition of a finger of the photographer or the like. A mechanical shutter that has a slidable light shielding curtain disposed in front of the image pickup unit 3 may be used in place of the electronic shutter. When the photographer half presses a release button 5 (SW1), the image pickup unit 3 starts photometry and AF, and a lens driving unit 6 in the lens unit 2 drives a focus lens 30.

Next, when the photographer fully presses the release button 5 (SW2), the image pickup unit 3 slides the electronic shutter to pick up an image. The image pickup unit 3 performs an exposure operation to start an operation of storing and reading electric charges. Then, the image pickup unit 3 records and stores a picked-up image in a storing medium 8 mounted in an image recording/reading unit 7 provided on a side of the camera 1. The image stored in the storing medium 8 is displayed on the display unit 4 when an image reproduction button 10 at the back of the camera 1 is pressed.

The camera 1 according to this embodiment has a system control circuit 11 that performs the general control of the camera 1. The system control circuit 11 includes a CPU, MPU, or the like to control the operations of individual circuits or the like to be described later. The system control circuit 11 incorporates a focus detection unit 12, and when AF starts, the system control circuit 11 controls the lens driving unit 6 based on the output of the image pickup unit 3 to drive the focus lens 30 in the direction of the optical axis for focusing. As one way of detecting focusing, there is an image pickup surface phase difference AF such that the image pickup unit 3 includes a focus detection pixel group and a pupil dividing lens group disposed in front of the focus detection pixel group in addition to an image pickup pixel group, and focusing on an imaging surface is detected based on a phase difference. Alternatively, focusing may be detected by using a contrast AF that detects focusing from a contrast difference of a picked-up image, or a wobbling method that drives the image pickup unit 3 in the direction of the optical axis forward and backward to achieve contrast AF may be used instead. Because those methods are publicly known, their detailed descriptions are omitted.

The system control circuit 11 incorporates an exposure detection unit 13, and determines the stop value of a stop 14 in the lens unit 2 and the speed of the electronic shutter of the image pickup unit 3 based on the output of the image pickup unit 3 in accordance with an image taking condition previously set by the photographer when photometry starts. When the image taking operation is started by the release button 5 (SW2), the system control circuit 11 allows an exposure controller 15 to control the stop value of the stop 14 and the charge storage time for the electronic shutter to the determined values. Further, the system control circuit 11 causes the exposure controller 15 to output a pulse signal needed to drive the image pickup unit 3 from a timing generator 16. The image pickup unit 3 performs the operation of storing and reading electric charges in accordance with the pulse signal output from the timing generator 16. The electric charges read out from the image pickup unit 3 are digitized by an A/D conversion circuit 17, and sent to an image processing circuit 18. The sent image undergoes white balance adjustment and image compression by an image processor 19 in the image processing circuit 18. A record controller 20 records and stores the resultant image in the storing medium 8 via the image recording/reading unit 7. The storing medium 8 is an ordinary SD card, CF card, or the like. When the image reproduction button 10 is pressed, the image recording/reading unit 7 reads out the picked-up image stored in the storing medium 8 into a display controller 21 in the image processing circuit 18, and is then converted by a D/A conversion circuit 22 into analog data to be displayed on the display unit 4.

Although FIG. 1 illustrates that the lens unit 2 according to this embodiment has only the focus lens 30, the lens unit 2 may have a zoom lens, or may be configured to be integrated with the lens or to be a dismountable separate unit. Further, a main mirror may be rotatably disposed in front of the image pickup unit 3 to realize an optical finder that guides light from the lens unit 2 to an eye of the photographer through a pentaprism and an image forming lens. Further, a sub mirror may be rotatably provided at the main mirror, and a focus detection unit based on phase difference AF may be provided separately from the focus detection unit 12 that detects focusing based on the output of the image pickup unit 3. Because those configurations described above are publicly known, their detailed descriptions are omitted.

Hereinafter, a method of setting an image taking condition is described. An image taking mode setting unit 23 serving as a dial operation member can set image taking modes, such as an automatic exposure mode, a stop priority mode (Av), a shutter speed priority mode (Tv), a manual mode (M), and a bulb mode (B). When the automatic exposure mode is set, the photographer arbitrarily sets the proper exposure value with an exposure setting unit 24 serving as a dial operation member, and the stop value and the shutter speed are automatically determined to provide the proper exposure at the time of taking an image. When the stop priority mode (Av), the shutter speed priority mode (Tv), or the manual mode (M) is set, the stop value and the shutter speed can arbitrarily be set with a stop value setting unit 25 and a shutter speed setting unit 26. When the bulb mode (B) is set, pressing the release button 11 (SW2) starts image taking, exposure continues during depression of the release button 11 (SW2) and ends when the release button 11 (SW2) is released. Thus, the shutter speed can be determined during image taking.

Hereinafter, the display unit 4 which is operable in a touch panel form is described. The display unit 4 has a capacitance sensor superimposed on a liquid crystal or an organic EL display panel for displaying an image. The capacitance sensor can detect a close condition and a contact condition of a finger of the photographer or the like. The capacitance sensor can detect the position of a finger of the photographer or the like in a close condition where the finger of the photographer or the like comes close to the display area of the display unit 4 and a contact condition where the finger of the photographer or the like is in contact with the display unit 4. The capacitance sensor has an insulating film and an electrode layer disposed thereunder in a lattice form, and when a conductive finger, pen, or the like comes close to the sensor, electrostatic induction from the electrode layer to the finger or the like occurs, and the capacitance of the insulating film disposed between the electrode layer and the finger changes. Then, a close/contact condition detection unit 27 incorporated in the system control circuit 11 reads a change in capacitance from the potential difference of the electrode layer to detect the position of the finger or the like. Under a state in which a finger or the like is close to the display unit 4, as compared to a finger or the like in contact with the display unit 4, a change in capacitance is small because an air layer having a low permitivity is located between the display unit 4 and the finger or the like. Therefore, the close/contact condition detection unit 27 can discriminate a close condition from a contact condition based on a threshold value set for the amount of a change in capacitance. The touch sensor may be an optical type touch sensor that detects reflection of light or brightness and darkness besides the capacitance type, and in the present invention, the touch sensor may take any detection method as long as a close condition can be detected.

Figure 3:
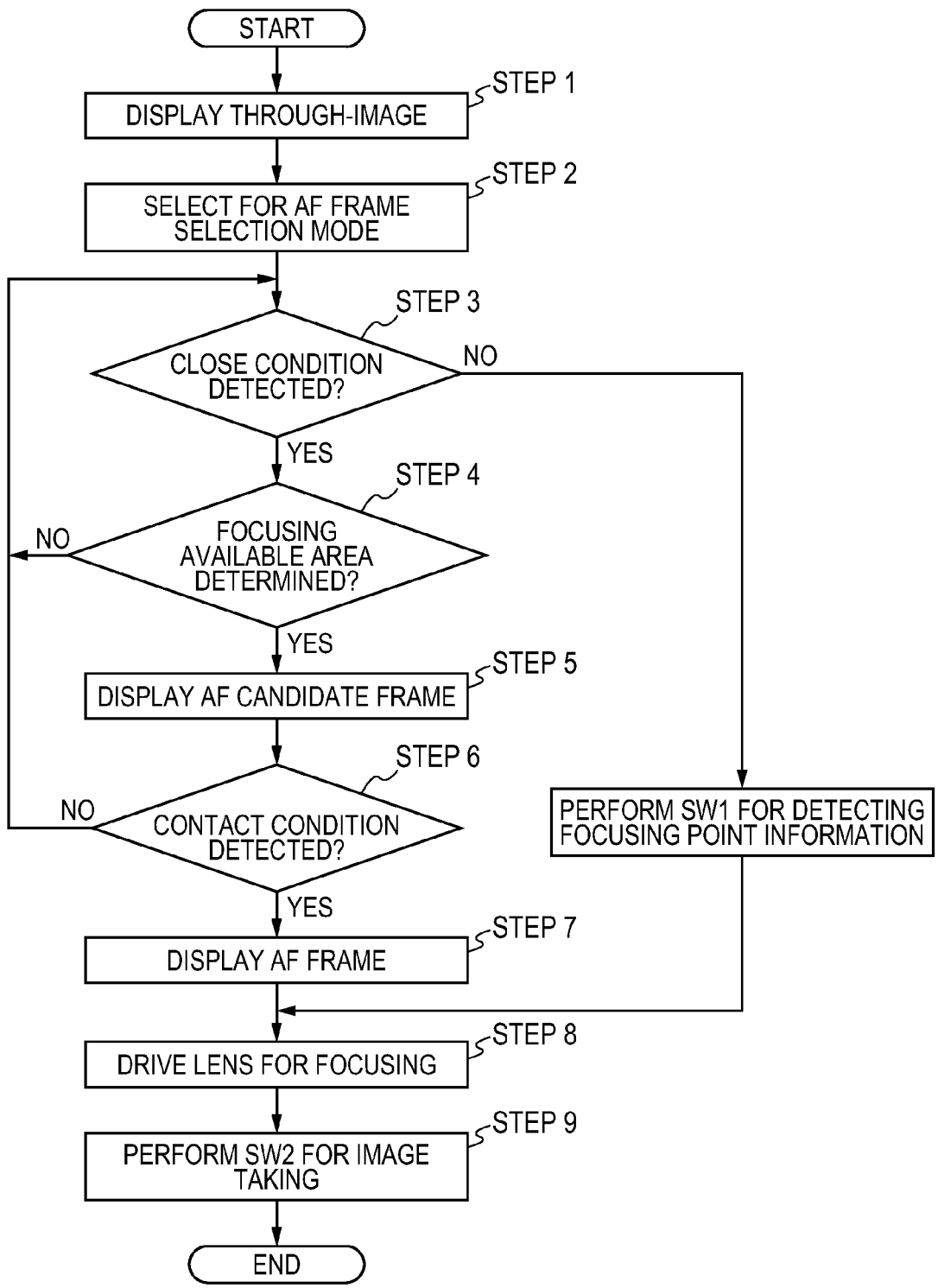
FIG. 3 is a flowchart illustrating an example of the operation of the camera applicable to the present invention.
Figure 4A:
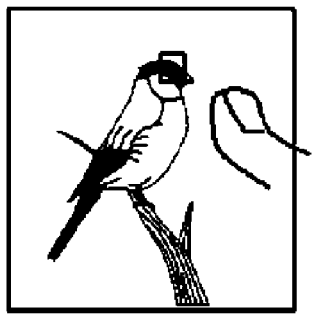
FIG. 4A is a schematic diagram illustrating a display example of an AF candidate frame that is provided by detection of a close condition to a touch panel.
Figure 4B:
FIG. 4B is a schematic diagram illustrating a display example of an AF candidate frame that is provided by detection of a close condition to a touch panel.
Figure 4C:
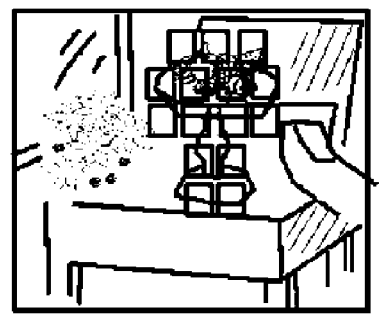
FIG. 4C is a schematic diagram illustrating a display example of an AF candidate frame that is provided by detection of a close condition to a touch panel.

Hereinafter, a method of displaying an AF candidate frame based on detection of a close condition to the touch panel, which is a feature of the present invention, is described referring to a flowchart of FIG. 3 and schematic diagrams of FIGS. 4A to 4C showing display examples of an AF candidate frame based on detection of a close condition. The camera 1 has an object recognition unit 28 and an AF frame selection mode changing unit 29 that changes an AF point selection mode in addition to the above-mentioned structures. The object recognition unit 28, which is incorporated in the system control circuit 11, specifies an area corresponding to a face or an entire object image based on the picked-up image of the object output from the image pickup unit 3, and recognizes the object. For example, face recognition is achieved by extracting face candidate areas in a picked-up image from characteristic points, such as a skin color, the contour of the face, an eye, and a nose, and deciding the face area from the amounts of the features. As another method, a plurality of templates showing the shapes of faces are provided, the correlation between the templates and a picked-up image is analyzed, and a face area is decided from the correlation value. Recognition of an object image is carried out in such a way that the background and an object image area are separated from each other and extracted based on information on the color, the shape, and the contrast. Because the method of recognizing an object image is publicly known, its detailed description is omitted.

The AF frame selection mode changing unit 29 may be provided as an operation member exclusive to the camera 1 as illustrated in FIGS. 2A and 2B, or may be provided in setting items that can be changed by a MENU button that changes the general setting of the camera 1. AF frame selection modes include a point tracking AF mode, a face recognition tracking AF mode, and a multipoint AF mode. In the point tracking AF mode, when a local point of an object is selected as illustrated in FIG. 4A, the focus detection unit 12 performs AF to track the local portion, and the focus lens 30 is operated in autofocus (AF). In the face recognition tracking AF mode, as illustrated in FIG. 4B, the object recognition unit 28 performs AF to track the face of the object, and the focus lens 30 is operated in autofocus (AF). In the multipoint AF mode, as illustrated in FIG. 4C, the entire object image recognized by the object recognition unit 28 is autofocused, the image taking conditions such as the stop value are controlled to focus on the entire object image, and the focus lens 30 is operated in autofocus (AF). In addition to the above-mentioned modes, there is a zone AF which widens the AF range from a local point. The present invention is not limited to those AF modes, and may be modified and changed within the scope of the subject matter of the present invention.

When the photographer powers on the camera 1, a through-image from the image pickup unit 3 is displayed on the display unit 4 first in STEP 1 of FIG. 3. The photographer can check the focusing, composition, and exposure of the object image from the through-image. In STEP 2, the photographer uses the AF frame selection mode changing unit 29 to select the AF frame selection mode from the above-mentioned point tracking AF mode, face recognition tracking AF mode, multipoint AF mode, and the like. In STEP 3, the display unit 4 detects a close condition of a finger of the photographer or the like. The close/contact condition detection unit 27 incorporated in the system control circuit 11 determines whether or not the finger of the photographer or the like is close to the display unit 4 based on the output of the capacitance sensor superimposed on the display unit 4. When the finger of the photographer or the like is not close to the display unit 4, the photographer presses the release button 5 to perform AF at the center or the automatically selected AF frame. Then, the focus lens 30 is operated in autofocus (AF) to execute normal image taking.

When a finger of the photographer or the like comes close to the display unit 4, the focus detection unit 12 detects focus information of an area of an image output from the image pickup unit 3 which corresponds to the position of the close condition detected, and a focusing portion determination unit 9 determines a focusing available range in STEP 4. That is, the focus detection unit 12 detects focus information for evaluating the focus position or condition of the object image from the image output from the image pickup unit 3, and the focusing portion determination unit 9 determines a focusing available range from the focus information. The determination on the focusing available range varies in accordance with the AF frame selection mode set in STEP 2. In the point tracking AF mode, using the display unit 4, a focusable local point approximately closest to the position of the detected close condition of the finger of the photographer or the like is determined as a focusing available range. When the object has a low contrast and there is no focusing available area in the range of detection of the close condition of the finger of the photographer or the like, an icon indicating that focusing is not possible is displayed on the display unit 4 to inform the photographer of the condition, and the flow returns to STEP 3.

In the face recognition tracking AF mode, the object recognition unit 28 extracts the face of an object in a neighborhood of the place of the detection of the close condition of the finger of the photographer or the like, and detects focus information on the face area to be regarded as a focusing available range. When a face area is not recognized in a neighborhood of the place of the detection of the close condition of the finger of the photographer or the like, an icon indicating that focusing is not possible is displayed on the display unit 4 to inform the photographer of the condition, and the flow returns to STEP 3. In the multipoint AF mode, the object recognition unit 28 extracts the entire object image in the range of the detection of the close condition of the finger of the photographer or the like, and detects focus information on the entire object image to be regarded as a focusing available range. When an object image is not recognized in a neighborhood of the place of the detection of the close condition of the finger of the photographer or the like, an icon indicating that focusing is not possible is displayed on the display unit 4 to inform the photographer of the condition, and the flow returns to STEP 3.

When the focusing available area is determined, the display unit 4 displays a first frame indicating a focusing available area in the focusing available range of the object image in accordance with each AF frame selection mode in a superimposed manner in STEP 5 as illustrated in FIGS. 4A to 4C. That is, when the display unit 4 detects a close condition of a finger of the photographer or the like is close to the display unit 4, the focus detection unit 12 detects focus information of an area of the output image of the image pickup unit 3 which corresponds to the range of the close condition detected by the display unit 4. Then, the focusing portion determination unit 9 determines a focusing available area based on the set threshold value and the focus information, and displays a first frame in the focusing available area. When the photographer touches the display unit 4 with a finger or the like in STEP 6, the display unit 4 detects the contact of the finger of the photographer or the like. The close/contact condition detection unit 27 incorporated in the system control circuit 11 determines the contact of the finger of the photographer or the like from the output of the capacitance sensor superimposed on the display unit 4. When the contact is determined, the first frame is changed to a second frame indicating a focusing command portion which is displayed in STEP 7. In STEP 8, the focus lens 30 is operated in autofocus (AF) to focus on the above-mentioned focusing available range. That is, when the photographer brings a finger or the like into contact with an object image shown on the display image, the display unit 4 displays the second frame indicating a focusing command portion on the display image of the object image corresponding to the range of the detection of the contact condition. The first frame indicating the focusing available area and the second frame indicating the focusing command portion might be displayed in different frame shapes or different colors so that the photographer can identify the frames. In STEP 9, the photographer fully presses the release button 5 (SW2) to take an image. At this time, the half depression (SW1) of the release button 5 is disregarded.

According to the present invention, as described above, a photographer can display an autofocusable AF frame at an intended position without making an object or the background displayed on a display difficult to see and without hiding the AF frame behind fingers or the like beforehand. Although the present invention has been described with respect to the exemplary embodiment, the present invention is not limited to the embodiment, and various changes and modifications may be made thereto within the scope of the subject matter of the present invention.

In regard to close/contact condition detection unit 27

In the foregoing description of the embodiment, the close/contact condition detection unit 27 is described to determine a close condition and a contact condition of a finger of the photographer or the like. The close/contact condition detection unit 27 may determine the degree of the close condition.

Figure 5:
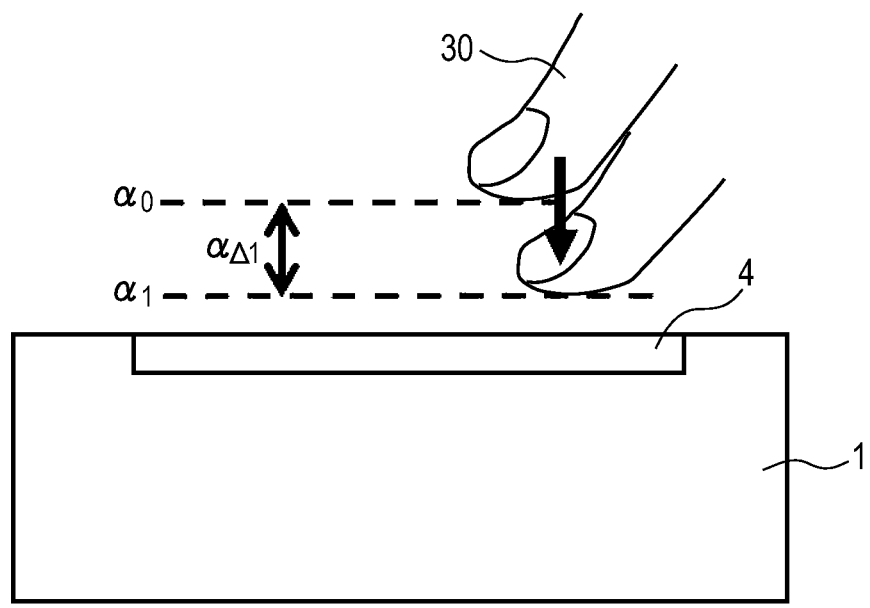
FIG. 5 is a schematic diagram illustrating close condition detection.

FIG. 5 is a schematic diagram illustrating the close condition detection in which the photographer brings a finger 30 close to the display unit 4 for touch in STEP 6 of the flowchart of FIG. 3. The contact may be determined when an output ax of the capacitance sensor superimposed on the display unit 4 becomes larger than a preset threshold value $\alpha_1$ even before the finger 30 touches the display unit 4. This configuration is effective when the display unit 4 needs protection from dirt such as sebum or when the display unit 4 is used by a photographer wearing gloves or the like. The threshold value $\alpha_1$ can be changed by the photographer to adjust the sensitivity as well. Alternatively, as illustrated in the schematic diagram of the close condition detection of FIG. 5, a change amount $\alpha\Delta_1$ from the output of the capacitance sensor that has detected the close condition in STEP 3 of the flowchart of FIG. 3 may be used as the threshold value for the determination.

Other Applications than Camera

The foregoing description of this embodiment has been given of the camera 1 referring to FIG. 1 which is a block diagram thereof and FIGS. 2A and 2B which are external perspective views thereof. An apparatus embodying the present invention may be a mobile device other than the camera 1.

Figure 6A:
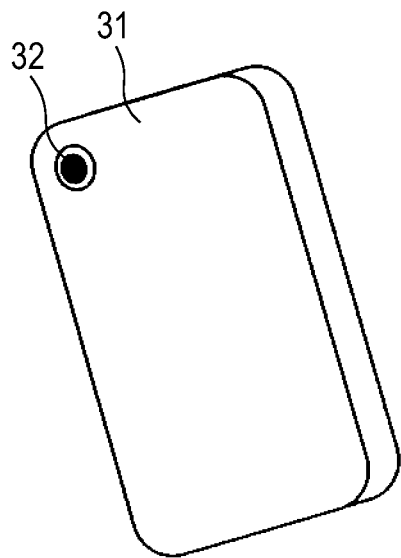
FIG. 6A is a front perspective view illustrating an example of a mobile device.
Figure 6B:
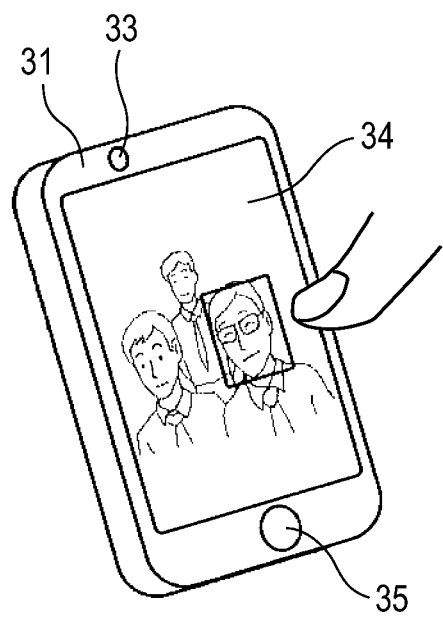
FIG. 6B is a rear perspective view illustrating the example of the mobile device.

FIGS. 6A and 6B illustrate a front perspective view and a rear perspective view of a mobile device 31, respectively. The present invention is applicable also to a smartphone or a tablet terminal including a built-in camera 32 configured as a device in which a focus lens and an image pickup unit are integrated on the front side and provided with a touch panel 34 capable of close condition detection and an operation member 35 for performing a predetermined operation on the rear side. Similarly to the camera 1, the point tracking AF mode, the face recognition tracking AF mode, and the multipoint AF mode can be selected. A face recognition function and a built-in camera 33 for self-shot are provided also on the rear side.

The present invention can achieve a camera capable of displaying an AF or an autofocusable AF frame at a position intended by a photographer without making an object or the background displayed on a display difficult to see and without hiding the AF frame behind fingers or the like beforehand.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-256955, filed Nov. 23, 2012, and 2013-230927, filed Nov. 7, 2013, which are hereby incorporated by reference herein in their entirety.

What is claimed is:

1. An image pickup apparatus, comprising:
   an image pickup unit configured to pick up an object image imaged by a lens unit; and
   a display unit configured to display an image output from the image pickup unit, the display unit detecting a first close condition and a second close condition of a photographer,
   wherein the display unit displays a first display object indicating a focal point adjustment area on a display image of the object image in response to detection of the first close condition, and displays a second display object indicating a focusing command area on the display image of the object image corresponding to a range of detection of the second close condition,
   the focal point adjustment area which is displayed by the display unit varies depending on a focal point adjustment mode, and
   the focal point adjustment mode comprises a first mode and a second mode, and a number of the first display objects to be displayed in the first mode is smaller than a number of the first display objects to be displayed in the second mode.

2. An image pickup apparatus according to claim 1, wherein the second close condition closer to the display unit than the first close condition is detected.

3. An image pickup apparatus according to claim 1, wherein the second close condition corresponds to a contact condition.

4. An image pickup apparatus according to claim 3, wherein the display unit displays the second display object indicating the focusing command area on the display image of the object image corresponding to a range of detection of the contact condition.

5. An image pickup apparatus according to claim 1, wherein the display unit displays the first display object indicating the focal point adjustment area corresponding to a range on the display unit where the first close condition is detected.

6. An image pickup apparatus according to claim 1, wherein the display unit displays the second display object indicating the focusing command area on the display image of the object image corresponding to a range on the display unit where the second close condition is detected.

7. An image pickup apparatus according to claim 1, wherein the display unit detects the first close condition and the second close condition of the photographer in a case where the photographer touches the object image shown on the display image with a finger or a pen.

8. An image pickup apparatus according to claim 1, wherein the focal point adjustment area which is displayed by the display unit is based on focus information obtained from the image output from the image pickup unit.

9. An image pickup apparatus according to claim 8, wherein the focus information is based on one of a contrast difference and a phase difference between the image output from the image pickup unit and the object image.

10. An image pickup apparatus according to claim 1, wherein the first display object which is displayed by the display unit is based on focus information obtained from the image output from the image pickup unit.

11. An image pickup apparatus according to claim 1, wherein display of the first display object and display of the second display object differ from each other in one of shape and color so that the photographer is capable of identifying the first display object and the second display object.

12. An image pickup apparatus according to claim 1, wherein the first display object is displayed in a frame.

13. An image pickup apparatus according to claim 1, wherein the second display object is displayed in a frame.

14. An image pickup apparatus according to claim 1, wherein the first display object indicating the focal point adjustment area is displayed in a superimposed manner on the image output from the image pickup unit.

15. An image pickup apparatus according to claim 1, wherein the display unit displays the first display object indicating the focal point adjustment area on the display image of the object image corresponding to a range of detection of the first close condition.

16. An image pickup apparatus according to claim 1, wherein the first mode corresponds to a tracking mode and the second mode corresponds to a multipoint mode.

\* \* \* \* \*